Figure 5:
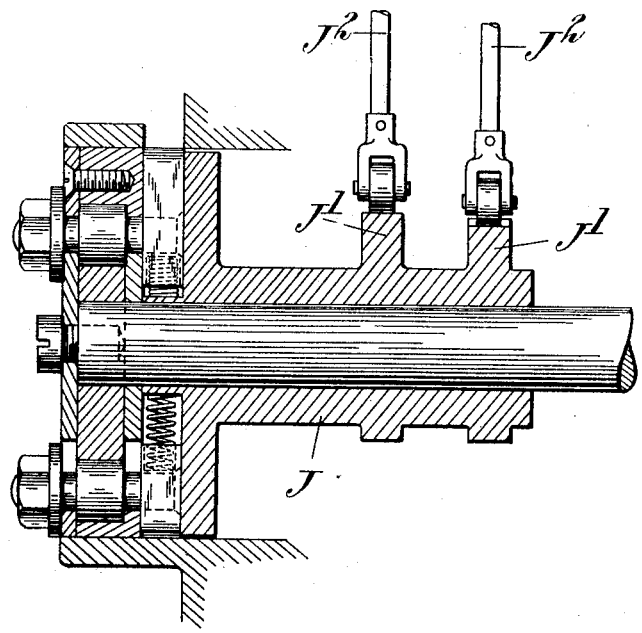

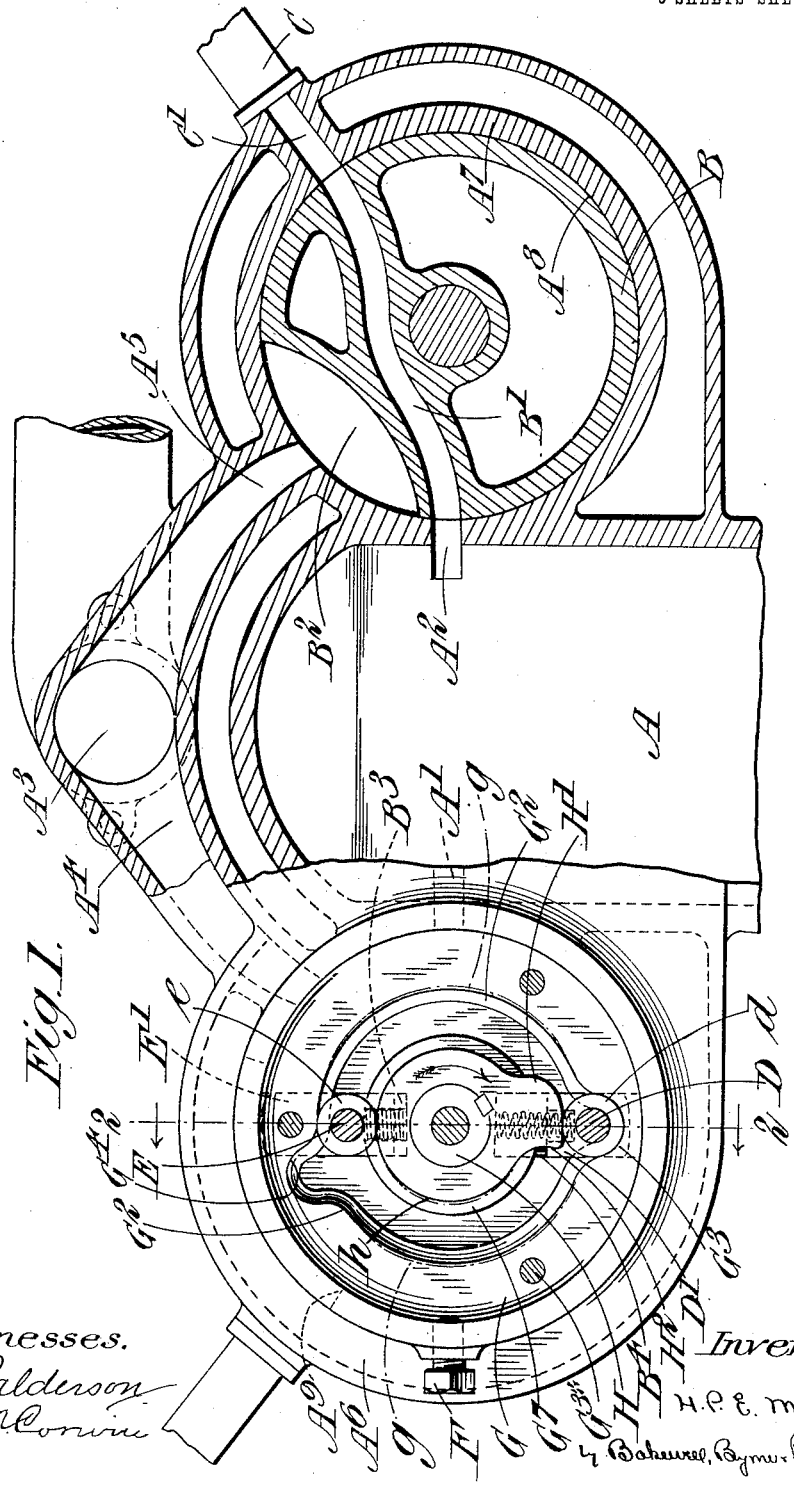

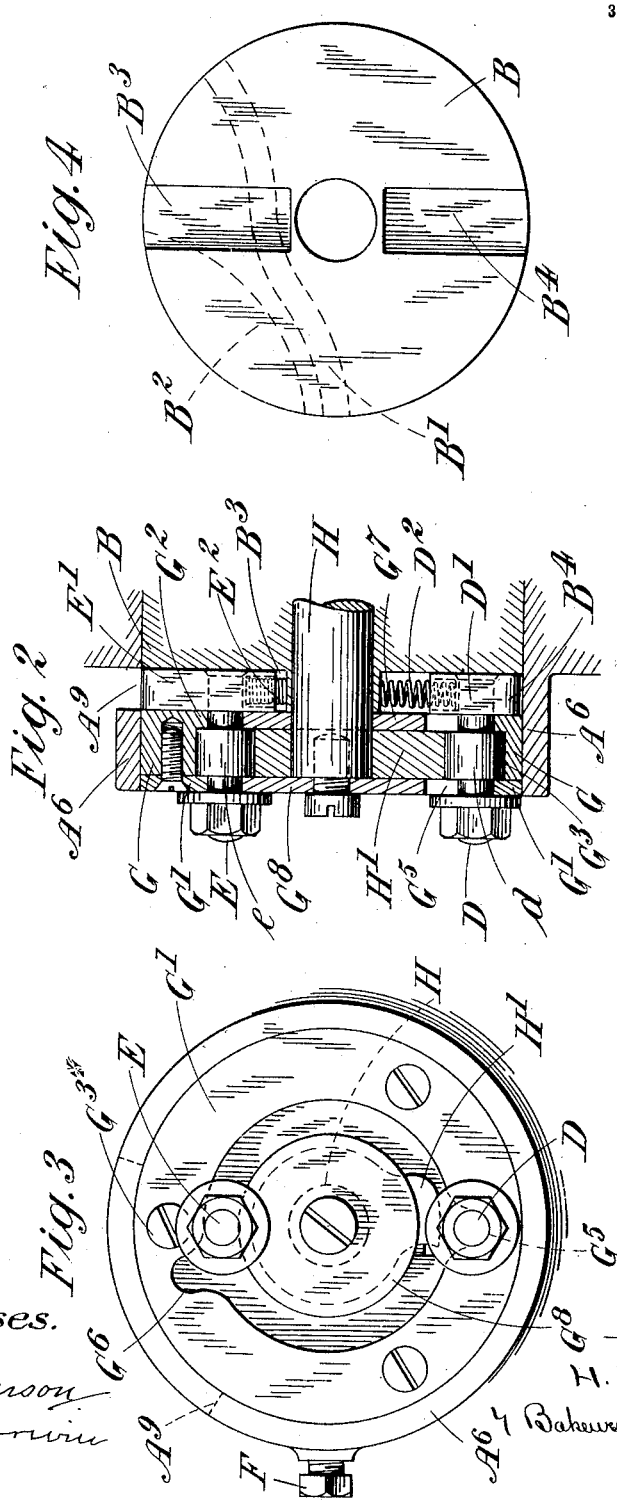

H. P. E. MILLER.
VALVE MECHANISM FOR INTERNAL COMBUSTION ENGINES.
APPLICATION FILED SEPT. 26, 1913.

1,112,225.

Patented Sept. 29, 1914.
3 SHEETS—SHEET 3.

UNITED STATES PATENT OFFICE.

HERMAN PHILIP ERIKSEN MILLER, OF HOLLINWOOD, OLDHAM, ENGLAND.

VALVE MECHANISM FOR INTERNAL-COMBUSTION ENGINES.

1,112,225.  Specification of Letters Patent.  Patented Sept. 29, 1914.

Application filed September 26, 1913. Serial No. 791,983.

*To all whom it may concern:*

Be it known that I, HERMAN PHILIP ERIKSEN MILLER, a subject of the King of England, residing at Hollinwood, Oldham, in the county of Lancaster, England, have invented certain new and useful Improvements in the Valve Mechanism of Internal-Combustion and other Engines, of which the following is a specification.

This invention is for improvements in or relating to mechanism for operating valves of internal combustion and other engines.

As is well known, internal combustion engines working on the Otto cycle usually have the valve operated by a cam shaft which rotates at half the angular velocity of the crank shaft, or if the valve is of the rotary type, it is connected to a member which is rotated at half the angular velocity of the crank shaft. This necessitates that the movement of the valve for opening and closing is comparatively slow and a greater efficiency could be obtained if the movement to the full open position and to the closing position could be effected more quickly, although the cycle of operations of the valve must, of course, still synchronize with the cycle of operations of the engine.

According to the present invention, valve mechanism for an internal combustion engine working on the Otto cycle comprises in combination, a rotary valve, a member which rotates continuously at the same angular velocity as the crank shaft, and means for automatically effecting rigid connection between the valve and the said continuously rotating member for moving the valve into the open and closed positions rapidly, and for automatically disconnecting the valve from the said continuously rotating member for the periods of dwell, whereby the Otto cycle is carried out with improved efficiency.

The continuously rotating member may be arranged to first carry the valve body forward (say a distance of 14°) for opening the inlet, then travels free of the valve body for a considerable distance (about 180°) during the suction period, whereupon it again picks up the valve body and advances it (say for 346°) during the compression and firing strokes, again releases it and travels forward free for about 180° during the exhaust period to bring it to the point whence it started, which cycle is continuously repeated.

The present invention may be applied to a valve body or valve-operating body which, according to known mechanism, has two operating studs in constant operative engagement with it, the said studs being each in turn carried forward by a driving cam and released therefrom. In this mechanism, the driving cam was rotated at half the angular speed of the crank shaft and the studs when released from the cam were returned by springs so that the valve or valve-operating body had a rocking movement. In applying the present invention to mechanism of this type for internal combustion or other engines, the said mechanism is modified by the cam being driven at the same angular velocity as the crank shaft and the guiding means being made such that both studs can travel completely around the axis of rotation of the cam, and each stud is, in turn, picked up by and released from the cam at intervals, the relative arrangement of the studs, guiding means and cams being such that when one stud has been carried around by the cam and then released, the other has been brought into the path of the cam by the movement of the valve body effected through the medium of the first stud. By this means the valve body receives an intermittent rotary motion and no spring is required for returning the valve body as its movement is always in one direction.

The guide for the studs takes the form of a channel surrounding the cam and having two or more pockets in that wall of the channel which faces the cam to receive the studs, said studs (or it may be the recesses) being arranged at points around the axis of rotation of the cam other than 180° apart, so that when one stud has been pushed into a recess, the other is in a position to be caught by the cam.

A further feature of the invention, as applied to a construction wherein the cam itself forms one wall of the channel for the studs and a fixed plate forms the other wall, consists in providing a camber on that part of the cam which leads up to the driving face, and a corresponding camber in the opposed wall provided by the fixed plate, so that the cam will pick up and start each stud in motion before the driving face is brought into contact with the stud, thereby avoiding knocking. One of the pockets and one of the studs may be so arranged that the said stud can never enter that particular pocket whereby the cam may be compelled to give practically a complete revolution to the valve-body at given intervals.

In the accompanying drawings which illustrate one method of carrying out this invention:—Figure 1 shows part of an engine cylinder with two sets of valve mechanism, one of which is shown in elevation and the other in transverse section through the valve-body; an outer plate which would obscure the parts shown on the left of Fig. 1 is omitted from this figure. Fig. 2 is a section through the valve-mechanism on the line 2—2 of Fig. 1, with the outer plate in position; Fig. 3 is an elevation of the parts shown in Fig. 2 viewed from the left of that figure, Fig. 4 is a face view of a detail, and Fig. 5 is a section similar to Fig. 2 with the valve body removed and a valve-operating body or cam sleeve substituted therefor.

Like letters indicate like parts throughout the drawings.

The cylinder A has two oppositely disposed ports $A^1$, $A^2$ respectively, and in the cylinder head an exhaust passage $A^3$ is provided which has two branch passages $A^4$, $A^5$ respectively. At the sides of the cylinder opposite the ports $A^1$, $A^2$ are two enlargements $A^6$, $A^7$, and in each enlargement a cylindrical chamber $A^8$ is provided which contains a rotary valve B. Only one valve and valve mechanism is required for the cylinder, but in some cases, for example for aeroplanes, it is desirable to have two lots of valve mechanism so that should one get out of order, the other can be instantly used in its place.

In the drawing, the valve-body B is shown in the position which it would occupy when the valve mechanism is in the position indicated on the left-hand side of the figure if such mechanism were operating that valve, and it may therefore be referred to as if it were the valve operated by that mechanism. The valve may take any convenient form, but is cored through at $B^1$ and has a side cavity at $B^2$. An induction conduit C for explosive mixture communicates with the chamber $A^8$ at $C^1$ and the cored passage $B^1$ can be brought into such position as to connect the port $C^1$ with the port $A^2$ as shown in Fig. 1, and the cavity $B^1$ is sufficiently large to connect the port $A^2$ with the exhaust passage $A^5$.

In the front face of the valve-body B or in a plate secured to it, two radial slots $B^4$, $B^3$ respectively are provided and in these slide shoes $D^1$, $E^1$ which carry studs D and E respectively. Springs $D^2$ and $E^2$ tend to push the shoes $D^1$, $E^1$ outwardly. The shoe $E^1$ is longer than the shoe $D^1$ and has its outer end normally in close proximity to the housing $A^7$ of the valve-body, but at one point the housing is cut away or recessed as shown at $A^9$ so that the shoe when the valve is in such position as to bring it opposite this point, can move outwardly.

Over the shoes $D^1$, $E^1$, and rigidly secured to the housing of the valve by any convenient means such as the set-screw F, is a frame comprising two separable parts G, $G^1$. The part G takes the form of a ring having on its interior face an inwardly-directed flange $G^2$ and in the inner face two pockets or recesses $G^3$, $G^4$ respectively. The pocket $G^4$ is situated at the same angular position as the recess $A^9$ formed by cutting away the housing. The flange $G^2$ is on that edge of the ring which lies next to the valve-body and the pockets are farther from the valve-body than the flange. The part $G^1$ also takes the form of a ring and is secured to the part G by screws $G^{3x}$ and has in its inner periphery recesses $G^5$, $G^6$ corresponding to the pockets or recesses $G^3$, $G^4$.

A driving shaft H which is mounted concentrically with the valve-body B but is not fast to the same, projects beyond the valve-body and extends into the frame G, $G^1$. Fast on the shaft H is a cam $H^1$ which lies within the member G and between the flange $G^2$ and part $G^1$. The cam has a driving face $H^2$. On the studs D, E, rollers $d$, $e$ are mounted and these are of such width that they fill the space between the flange $G^2$ and the ring or plate $G^1$ and are thus guided and kept in position by these parts. The rollers thus help to support the studs D, E and to further guide and assist in their support, a washer $G^7$ of the same thickness as the flange $G^2$ is placed around the shaft H, the washer being of such dimensions that a channel is left between it and the flange $G^2$ in which the stud can run as a working fit. Similarly a disk $G^8$ is secured to the end of the shaft H in the same plane as the ring or plate $G^1$ and helps to support the outer ends of the studs D and E. It will be observed, however, that the rollers operate between the main body portion of the ring G and the cam $H^1$ so that the space between these two parts constitutes the guide proper for the studs D and E.

The operation of this mechanism is as follows:—When the mechanism is in the position shown on the left of Fig. 1, the valve-body operated by such mechanism is in the same position as is indicated by the valve B on the right, that is to say mixture is being admitted through the port $A^1$ to the cylinder A. For convenience, however, we will suppose that the mechanism on the left is superimposed upon the valve on the right, which, as already stated, would be provided with operating mechanism of exactly the same construction, so that mixture is being admitted through the port $C^1$, the cored passage $B^2$, and the port $A^2$ to the cylinder, and both the ports $C^1$ and $A^2$ are wide open. The cam H is moved in the direction of the arrow thereon at the same speed as the engine shaft, and as the stud D has been pushed into the pocket $G^3$ by its spring $D^2$, the cam H can pass it without displacing it. The valve-body B therefore remains stationary until the driving face $H^2$ of the cam is brought against the roller of the stud E which lies in its path. The stud is then advanced and thereby the valve-body is advanced in a clockwise direction and owing to the fact that the shaft H rotates at engine speed, only a small angular movement, about 10°, of the engine shaft is required to bring the valve into the position for closing the inlet. The further movement of the cam H carries the stud E around with it and continues to rotate the valve B in the clockwise direction for practically a complete revolution (that is about 346°) during the compression and firing strokes. The stud E is the one whose shoe $E^1$ is longer than the shoe $D^1$ and therefore when the stud arrives opposite the recess $G^3$ it cannot enter the same as its shoe butts against the wall of the housing $A^7$. It is this that enables the cam to carry it around for nearly a complete revolution, after which it drops into the recess $G^4$ as the housing at this point is cut away at $A^9$ to permit the shoe to move outward. In the recess $G^4$ the cam leaves it and the valve B has now been brought to such position that the cavity $B^2$ puts the ports $A^2$, $A^5$ into communication with each other for full exhaust. The stud D may move out into the recess $G^4$ when the cam is moving the valve by means of the stud E; when it enters the recess, however, the cam continues to move the stud E and the stud D is therefore brought forward again out of the recess since it can not lock the valve body in that position against the continued action of the cam. The exhaust port begins to open when the valve is about 30° from its position of rest with the stud E in the recess $G^4$, but it is completely open when the stud is brought to the said position of rest. The stud D now lies in the path of the cam H and after traveling about half a revolution (180°), the driving face of the cam strikes the roller $d$ of the stud D and again moves the valve-body forward until the stud is opposite the recess $G^3$, when the shoe $D^1$ which is the short one, is advanced by the spring, and the stud thereby enters the recess and clears the cam. During this movement, the valve-body B has once again been brought around into the position for inlet and the stud E, by the movement of the valve B, has been drawn out of the recess $G^4$ and again lies in the path of the cam ready for the latter to strike it and carry it forward for the purpose of closing the inlet prior to compression. This cycle of operations is continuously repeated, and it will be seen that as the cam $H^1$ is traveling at engine speed, the movement of the valves whether for closing or opening is rapid, and the valve can be made to remain open for induction or exhaust for such period as will produce the best possible results.

It will be observed that since the recesses $G^3$ $G^4$ are not diametrically opposite each other, but are set apart at an angle other than 180°, and since the studs are set apart at an angle of 180°, when one of the studs is in one of the recesses, the other stud is necessarily not in the other recess, but is in the path of the cam; moreover, the relative displacement of these two recesses will control the interval during which the cam is in engagement with neither stud and will, therefore, control the interval which elapses between the closing of the inlet and the opening of the exhaust.

In order that the driving face of the cam $H^1$ may not be violently brought against the rollers $d$, $e$, of the studs D, E, the body part of the cam which is in general circular, is slightly enlarged from the point marked $h$ to the driving face $H^2$, the amount of such enlargement being indicated by the dotted line which shows what would be the continuation of the circular portion. Similarly the inner face of the part G which in general is circular, is recessed at $g$. It follows therefore that when the cam is about to pick up a roller, the enlarged part $h$ first comes into contact with the roller and begins to roll it along the face of the part G, but as the roller comes opposite the recessed portion $g$ of the said face, the cam gains upon it although still keeping it in movement, until the driving face $H^2$ comes against the roller without violence; the valve-body is thus kept in motion gradually and without shock.

It will be observed that the valve-body B controls three ports in its housing $A^2$, $A^5$ and $C^1$, whereof the cylinder-port $A^2$ and the induction port $C^1$ are separated by not more than about 140° as measured from center to center, and the exhaust port $A^5$ is situated intermediate of these two (within the said angle of 140°) the ports in the valve-body being correspondingly situated within an arc of 140° of its circumference. The advantage of this arrangement is that while the ports can be of sufficient dimensions to render them effective, a considerable body of metal can be disposed between the leading edge of the exhaust port and the inlet port, and the main body of the valve can be employed to close the cylinder-port during compression and firing.

It will be appreciated that this mechanism can be used to drive the cams for operating puppet valves instead of driving the rotary valves, and such an adaptation is shown in Fig. 5 where the valve-body B is dispensed with and a cam-sleeve J is substituted therefor. The sleeve is shown as having two cams $J^1$ against which puppet-valve operating rods $J^2$ bear, and are operated in the usual well-known manner.

What I claim as my invention and desire to secure by Letters Patent is:—

1. In valve mechanism the combination of a continuously rotating driving member, a rotary valve-operating body, studs rotatable therewith and movable radially thereto into and out of engagement with said driving member, guiding means coöperating with said studs whereby when one stud has been carried around by the driving member and then released the other has been brought into position to be engaged by the driving member by the movement of the valve-operating body effected by the first stud, substantially as described.

2. In valve mechanism, the combination of a continuously rotating driving finger, a rotary valve-operating body, studs movable radially thereto but rotating therewith, and guiding means providing a channel surrounding said finger and wherein said studs move when engaged by said finger, the channel having a plurality of pockets in its outer wall to receive said studs when not engaged by said finger, said pockets being disposed other than diametrically opposite one another, substantially as described.

3. In valve mechanism, the combination of a rotary valve-operating body, studs movable radially thereto but rotating therewith, guiding means providing a channel wherein said studs move, a driving finger having a central hub constituting one side of said channel, a driving face on said finger whereby said studs are moved in said channel, said channel having a plurality of pockets in its outer wall whereinto said studs are moved out of engagement with said driving face, said pockets being disposed other than diametrically opposite one another, and a cambered portion on the central hub of said driving finger adjacent said driving face and engaging said studs, substantially as described.

4. In valve mechanism, the combination of a continuously rotating driving finger, a rotary valve-operating body, a plurality of studs movable radially thereto but rotating therewith, guiding means providing a channel surrounding said driving finger, said channel having a plurality of pockets in its outer wall whereinto said studs are moved when brought opposite them, and means preventing one of said studs from entering one of said pockets, substantially as described.

5. In valve mechanism, the combination of a continuously rotating driving finger, a rotary valve-operating body having radial slots therein, shoes movable longitudinally in said slots, studs on said shoes, guiding means providing a channel surrounding said driving finger, said channel having a plurality of pockets in its outer wall whereinto said studs are moved out of engagement with said driving face, a casing surrounding said valve-operating body, and limiting the radial travel of said shoes, one of said shoes being of such length as to prevent its stud from entering said pockets, and a recess in said outer casing permitting said shoe to move outward opposite one pocket whereby said stud enters said pocket, substantially as described.

6. In an internal combustion engine, the combination of a crank shaft, a valve-operating shaft rotating at the same speed as said crank shaft, a driving finger on said valve-operating shaft, a rotary valve-operating body, studs movable radially thereto and rotating therewith, guiding means providing a channel surrounding said driving finger wherein said studs move when engaged by said finger, said channel having a plurality of pockets in its outer wall to receive said studs when not engaged by said finger, said pockets being disposed other than diametrically opposite one another, substantially as described.

7. In valve mechanism, the combination of a continuously rotating driving member, a rotary valve-operating body, studs movable radially thereto but rotating therewith, guiding means providing a channel surrounding said driving member and wherein said studs move when engaged by said member, the channel having a plurality of pockets in its outer wall to receive said studs when not engaged by said driving member, said pockets being disposed other than diametrically opposite one another, a rotary valve operatively connected to said valve-operating member, a housing for said valve, said housing having a cylinder port, and an induction port not more than 140° apart, and an exhaust port situated between said ports, said rotary valve having a passage whereby said induction port communicates intermittently with said cylinder port, and a cavity whereby said cylinder port communicates intermittently with said exhaust port, the ends of said passage and said cavity being disposed within an arc of 140°, substantially as described.

In testimony whereof I have signed my name to this specification in the presence of two subscribing witnesses.

HERMAN PHILIP ERIKSEN MILLER.

Witnesses:
A. M. HAYWARD,
HAROLD H. SIMMONS.

Copies of this patent may be obtained for five cents each, by addressing the " Commissioner of Patents, Washington, D. C."